May 4, 1965

R. H. SCHAEFER 3,181,386

TRANSMISSION

Filed Nov. 13, 1962

INVENTOR.
Robert H. Schaefer
BY
A.M. Heiter
ATTORNEY

United States Patent Office 3,181,386
Patented May 4, 1965

3,181,386
TRANSMISSION
Robert H. Schaefer, Westfield, Ind., assignor to General
Motors Corporation, Detroit, Mich., a corporation of
Delaware
Filed Nov. 13, 1962, Ser. No. 237,037
5 Claims. (Cl. 74—472)

This invention relates to transmissions and more particularly to transmissions having automatic control systems.

In automatic transmissions where control signals, such as a torque demand pressure controlled by the throttle and a governor pressure are employed to operate a shift valve controlling the flow of fluid to a motor to engage a drive, it has been found that the high volume flow through the valve due to the restriction as the valve land partially opens the port creates pressure drop resulting in an extraneous axial Bernoulli force on the valve interfering with proper operation by the control signals. It has been found that the Bernoulli effect on the valves may be significantly reduced so that it does not create an extraneous force which interferes with the valve performance by undercutting the land and leaving a very thin wall land surface portion having a very sharp edge so that the pressure drop is limited to a point in the flow path and there is a substantially instantaneous pressure drop. With this arrangement the fluid forces acting between the valve lands are substantially equalized. The pressure at any point is equal to the summation of the velocity pressure and static pressure. During throttling action the velocity pressure increases and the static pressure decreases. It is this reduction in the static pressure which creates the Bernoulli effect. The static pressure reduction due to the throttling effect of the oil acts on an insignificant valve area substantially limited to this knifelike edge. With this type of construction the Bernoulli effect does not interfere with proper operation of the valve.

An object of the invention is to provide in an automatic transmission having a shift valve controlled by transmission operating conditions for connecting a source to a fluid motor for operating a fluid pressure ratio engaging device, a shift valve having a control land with a sharp edge and an undercut portion to substantially eliminate the Bernoulli effect which causes an extraneous force.

Another object of the invention is to provide in an automatic transmission having a shift valve controlled by transmission operating conditions for connecting a source to a fluid motor for operating a fluid pressure ratio engaging device, a shift valve having a control land with an axial thin wall extension providing an extended land surface area and terminating in a sharp edge to substantially eliminate the Bernoulli effect which causes an extraneous force during flow through the valve.

These and other objects of the invention will be more apparent from the following description and drawings of the preferred embodiment.

FIGURE 1 diagrammatically shows a transmission and control system.

Figures 1, 2, 3:
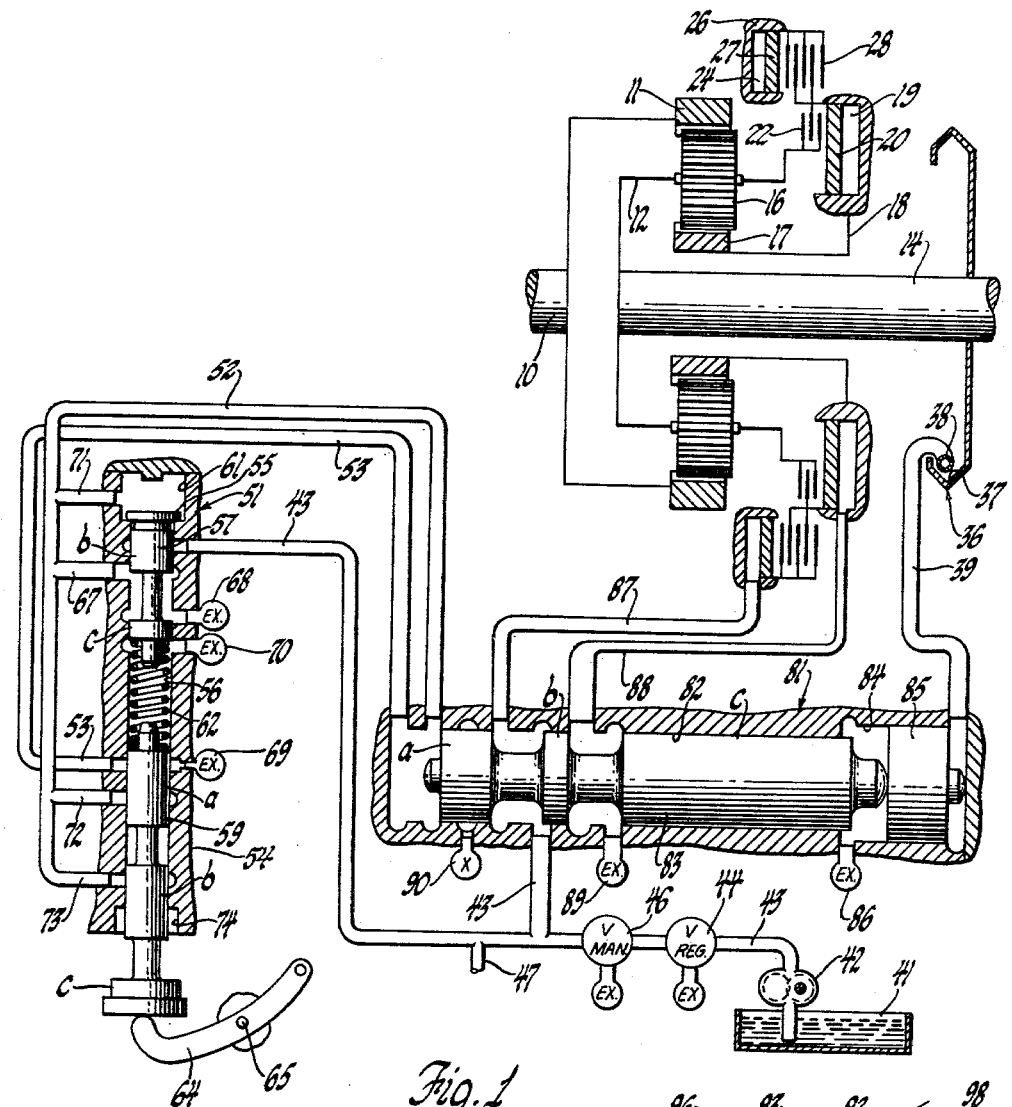
FIGURE 2 is a partial enlargement of the shift valve.
FIGURE 3 is a partial detailed view of the shift valve land.

The invention is illustrated in a two-speed transmission and control system shown in FIGURE 1. The transmission gear unit has an input shaft 10 driving a ring gear 11 of a planetary gear set having a carrier 12 connected to drive the output shaft 14. Planetary pinions 16 are mounted on the carrier and mesh with the ring gear 11 and the sun gear 17 connected to a control hub 18. The control hub 18 has formed thereon a cylinder 19 in which the piston 20 reciprocates to engage the clutch or friction torque establishing device 22 to interconnect the carrier 12 and the sun gear 17 to lock up the gear unit to engage the higher ratio or direct drive. The cylinder 24 mounted on the fixed transmission housing 26 has a reciprocal piston 27 which is actuated by fluid pressure to engage the reaction brake 28 to connect the sun gear control hub 18 to the stationary housing 26 to hold the sun gear to provide the lower speed drive. Each piston and cylinder provides a motor which in combination with the clutch 22 or brake 28 provides a fluid operated drive engaging means.

The pitot governor 36 has an annular trough 37 which is filled with fluid from the lubrication system so that a rotating body of fluid impinges on the open end of the pitot tube 38 to provide in the governor line 39 a pressure proportional to output shaft speed.

The fluid control system has a sump 41 conventionally located in the lower portion of the transmission housing from which fluid is delivered by a pump 42 to the main supply line 43 in which the pressure is regulated by a pressure regulator valve 44 and the directional oil flow may be controlled by a manual valve 46. The main line 43 also has a branch 47 connected in a conventional manner to lubricate the transmission and supply fluid to fill the pitot governor trough 37.

Main line 43 is connected to the throttle valve 51 to supply a throttle pressure to line 52 proportional to torque demand or throttle pedal position and a downshift pressure to line 53 to supply a forced downshift pressure. The throttle valve 51 has a body 54 having a bore 56 in which the regulator valve 57 having lands $b$ and $c$ and a downshift valve 59 having lands $a$, $b$ and $c$ is reciprocally mounted. An enlarged stop portion 55 engages the shoulder between bore portions 56 and 61 to limit closing movement of the valve element so at zero throttle line 67 is connected to exhaust 68 and has sufficient clearance to permit free movement but may be slightly restricted for damped movement. A spring 62 is located between the downshift valve 59 and the regulator valve 57. The throttle pedal controls, through a suitable linkage, the lever 64 which is pivoted to the frame at 65 and engages the land $c$ of the valve element 59. When the throttle is closed, valve assembly 51 is in the position shown connecting the throttle pressure line 52 via branch 67 between the lands $b$ and $c$ of valve 57 to exhaust 68 and the downshift line 53 is connected to restricted exhaust 69 so no throttle pressure or downshift pressure is provided. As the throttle is advanced the lever 64 moves the valve element 59 into the valve bore compressing spring 62 to provide a gradually increasing biasing force on the valve 57 to move the valve element so land $c$ closes exhaust 68 and main line 43 is connected between the lands $b$ and $c$ to the throttle line branch 67 and is also connected by the branch 71 to the bore portion 61 to act on the land $b$ to oppose the spring force to regulate the throttle pressure in line 52 proportional to the throttle pedal position. Exhaust 70 vents spring chamber portion of the bore 56. At or about full throttle position, the throttle pressure, which is high and may be 70% of or equal to main line pressure, in throttle pedal branch 72 is connected between the lands $a$ and $b$ of valve element 59 to downshift line 53 to provide a forced downshift pressure. Throttle pressure is also connected by branch 73 between the lands $b$ and $c$ to act on the unbalanced area of land $c$ now just entering the large bore portion 74 to provide a hydraulic detent advising the operator that a downshift pressure is being provided.

The shift valve 81 has a valve bore 82 and a valve element 83 therein having lands $a$, $b$ and $c$. The lands $a$ and $b$ may have a slightly larger diameter than the land $c$ and the bore portion in which they operate will be correspondingly larger to provide hydraulic hysteresis on an upshift. The lands may have labyrinth seal grooves as shown in FIG. 2. The throttle pressure line 52 and downshift line 53 are connected to the closed end of bore 82 to act on the end of land a to urge the valve in a downshift direction. It will be noted that preferably a rateless shift valve is employed without any biasing spring, but it will be appreciated that a biasing spring can be located at this end of the valve bore to act on land a to bias the valve toward a downshift position. The governor pressure supplied by line 39 is connected at the opposite end of the valve to an enlarged bore portion 84 to act on the valve plug 85 which engages the valve element 83 to urge it in the opposite direction to an upshift position. Exhaust 86 vents the bore between valve plug 85 and valve element 83.

With the shift valve in the downshift position shown, main line 43 is connected between the lands a and b to the low brake supply line 87 to actuate the motor 24–27 to engage the brake 28. High clutch line 88 is connected to exhaust 89 disengaging the high clutch. When the force provided by governor pressure acting on the shift valve 83 overcomes the force due to throttle pressure, the valve moves to the left or upshifts, connecting the main line 43 between the lands b and c to the high clutch line 88 which supplies fluid to the motor 19–20 to engage the high or direct drive clutch 22. The low brake is disengaged since the supply line 87 is connected to exhaust 90.

Referring to the partial view (FIG. 2) showing the valve detail, the valve element 83 is in an intermediate position during movement from the downshift position shown in FIGURE 1 to the upshift position. The valve element is at the point where the land b, after closing port 91 of line 43, initially opens the port 91 to the space between the lands b and c for supplying clutch line 88. It will be appreciated that there is a high degree of restriction between the annular port 91 and the lip or edge 92 of the land b at the moment this port is cracked open. With lands constructed in the ordinary manner, as land a for example, the restriction on initial opening on the port by the land causes a Bernoulli force. This Bernoulli effect at the restriction due to the high fluid velocity through the restriction substantially reduces the static pressure in the area of high flow and provides a substantial extraneous force tending to move the valve toward the downshift position to the point where the port 91 would just be closed. This interferes with the shifting operation of the valve and causese malfunction due to the interference by this extraneous force with the designed operation of the valve by the forces provided by governor and throttle pressures.

This Bernoulli effect can be eliminated for all practical purposes so there is no significant extraneous force by forming the annular valve land to provide a thin wall extension 93 at the outer perimeter of the land body 94 extending the land surface 96 and providing an annular cavity 97 in the land. The terminal end of the thin wall extension 93 terminates in a knife-like edge 92 at the land surface. The thin wall extension is made as light as possible and the full height of the land body to provide a large volume substantially rectangular annular expansion chamber. In small diameter valves, slightly less than an inch in diameter, it has been found that it is preferable to undercut the edge of the valve at a sharp angle, such as the angle 98 in FIGURE 3, having a value of not more than 40° and preferably about 30°. The edge 92 of this valve element B should not have a radius of more than .005 and preferably about .002 of an inch. The thin wall extension is preferably about 0.35 of an inch or about 1/20 of the height of the land. With this construction, though there is a pressure reduction as the fluid passes through the restriction between the land edge and the annular port edge, the pressure rises again almost instantaneously. Thus the pressure reduction occurs substantially only at the annular line around the valve element at the edge 92. Since the pressure reduction acts on an insignificant area of the valve element, there is an insignificant extraneous force on the valve and the valve functions properly in accordance with control conditions.

The above-described preferred embodiment is illustrative of the invention and it will be appreciated that it may be modified within the scope of the appended claims.

What is claimed is:

1. In a transmission, drive means providing a drive and including fluid operated drive engaging means, a source of fluid under pressure, governor means providing a force proportional to transmission speed, torque demand means providing a force proportional to torque demand, shift valve means operatively connected to said governor means and said torque demand means and controlled by said governor and torque demand forces to move between a downshift position and an upshift position, said shift valve means in said downshift position connecting said fluid operated drive engaging means to exhaust and movable in response to governor and torque demand forces to connect said source to said fluid operated drive engaging means to engage the drive, said valve including a valve body having a cylindrical bore and an annular port located in an intermediate portion of said bore and connected to said source and including a movable valve element having a land fitting said bore and an adjacent coaxial annular passage portion of uniform annular section, said land opening said port during upshifting movement of said valve element having a land edge extending into said passage portion and controlling flow through said port, said land having a thin walled impervious axial extension of the body at the external perimeter providing an extended land surface terminating in a knife-like edge to limit the pressure reduction at the restriction between the annular port and the annular edge of the valve land substantially to the annular area of said knife-like edge to substantially eliminate any extraneous forces produced by the Bernoulli effect due to fluid flow through said port.

2. In a transmission, drive means providing a drive and including fluid operated drive engaging means, a source of fluid under pressure, governor means connected to said transmission to provide a force proportional to transmission speed, torque demand means to provide a force proportional to torque demand, shift valve means including a body having an axial bore and a valve element in said bore operatively connected to said governor means and said torque demand means and controlled by said governor and torque demand forces to move said valve element between a downshift position and an upshift position, said shift valve body having an annular supply port with side walls substantially perpendicular to the axis connected to said source and an annular drive port connected to said fluid operated drive engaging means and operative in said downshift position connecting said fluid operated drive engaging means to exhaust and movable in response to governor and torque demand forces to connect said source through said supply port to said drive port and said fluid operated drive engaging means to engage the drive, said valve including a first annular land and a second annular land cooperating with said annular supply port and a uniform coaxial annular space between said lands, said second land opening said port during upshifting movement of said valve element having a land edge controlling flow through said supply port to the space between said lands, said second annular land having a thin walled impervious axial extension of the body at the external perimeter providing an extended land surface terminating in a knife-like edge at the land surface to limit the pressure reduction at the restriction between the annular port and the annular edge of the valve land substantially to the annular area of said knife-like edge to substantially eliminate any extraneous forces produced by the Bernoulli effect due to fluid flow through said port.

3. In a transmission, drive means providing a drive and including fluid operated drive engaging means, a source of fluid under pressure, governor means connected to said source to provide a pressure proportional to transmission speed, torque demand means connected to said source to provide a pressure proportional to torque demand, shift valve means operatively connected to said governor means and said torque demand means and controlled by said governor and torque demand pressures to move between a downshift position and an upshift position, said shift valve means including a body having a bore and a valve element movable in said bore operative in said downshift position connecting said fluid operated drive engaging means to exhaust and movable in response to governor and torque demand pressures to connect said source to said fluid operated drive engaging means to engage the drive, said valve including a movable valve element having annular land and a coaxial space of uniform cross section adjacent said land and a body having an annular port connected to said source, said land opening said port during upshifting movement of said valve element having a land edge controlling flow through said port, said annular land having an impervious thin walled axial extension of the body at the external perimeter providing an extended land surface terminating in a knife-like edge providing said land edge at the land surface to limit the pressure reduction at the restriction between the annular port and the annular edge of the valve land substantially to the annular area of said knife-like edge to substantially eliminate any extraneous forces produced by the Bernoulli effect due to the fluid flow through said port.

4. In a valve assembly, means providing a control force automatically in response to an operating condition, a body having an annular supply port for connection to a source and a delivery port for connection to a fluid operated means and having an axial bore, biasing means, a valve element movable in said bore and operative in one position blocking flow from said supply port to said delivery port and movable in response to said control force overcoming said biasing means to connect said supply port to said delivery port, said valve element including an annular land cooperating with said annular supply port and an extended adjacent flow space of uniform cross section, said land opening said supply port during movement of said valve element having a land edge controlling flow through said supply port, said annular land edge having an impervious thin walled axial extension of the body at the external perimeter providing an extended land surface terminating in a knife-like edge at the land surface to limit the pressure reduction at the restriction between the annular supply port and the annular edge of the valve land substantially to the annular area of said knife-like edge to substantially eliminate any extraneous forces produced by the Bernoulli effect due to fluid flow through said supply port.

5. In a valve assembly, means providing a control force automatically in response to an operating condition, a body having an annular supply port for connection to a source and a delivery port for connection to a fluid operated means and having an axial bore, biasing means, a valve element movable in said bore and operative in one position blocking flow from said supply port to said delivery port and movable in response to said control force overcoming said biasing means to connect said supply port to said delivery port, said valve element including an annular land cooperating with one port and an extended adjacent flow space of uniform cross section, said land opening said one port during movement of said valve element having a land edge controlling flow through said one port, said annular land having an impervious thin walled axial extension of the body at the external perimeter providing an extended land surface terminating in a knife-like edge at the land surface to limit the pressure reduction at the restriction between said one port and the annular edge of the valve land substantially to the annular area of said knife-like edge to substantially eliminate any extraneous forces produced by the Bernoulli effect due to fluid flow through said one port.

References Cited by the Examiner

UNITED STATES PATENTS

| 2,713,800 | 7/55 | Forster. |
| 2,812,775 | 11/57 | Hodgson _____ 251—282 XR |
| 2,913,931 | 11/59 | Hilpert. |
| 3,078,736 | 2/63 | Meads et al. |

FOREIGN PATENTS 470,032   3/52   Italy.

DON A. WAITE, *Primary Examiner.*

UNITED STATES PATENT OFFICE
CERTIFICATE OF CORRECTION

Patent No. 3,181,386                                                 May 4, 1965

Robert H. Schaefer

It is hereby certified that error appears in the above numbered patent requiring correction and that the said Letters Patent should read as corrected below.

Column 3, line 70, for "0.35" read -- .035 --.

Signed and sealed this 15th day of March 1966.

(SEAL)
Attest:

ERNEST W. SWIDER                                   EDWARD J. BRENNER
Attesting Officer                                      Commissioner of Patents